US 9,246,175 B2

(12) United States Patent
Pak et al.

(10) Patent No.: US 9,246,175 B2
(45) Date of Patent: Jan. 26, 2016

(54) COMPOSITE SUPPORT, METHOD OF PREPARING THE SAME, ELECTRODE CATALYST INCLUDING THE COMPOSITE SUPPORT, AND MEMBRANE-ELECTRODE ASSEMBLY AND FUEL CELL EACH INCLUDING THE ELECTRODE CATALYST

(71) Applicant: Samsung Electronics Co., Ltd., Suwon-si, Gyeonggi-do (KR)

(72) Inventors: Chan-ho Pak, Seoul (KR); Dae-jong Yoo, Seoul (KR); Ji-man Kim, Seoul (KR); Jin-hoe Kim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 200 days.

(21) Appl. No.: 13/848,940

(22) Filed: Mar. 22, 2013

(65) Prior Publication Data
US 2013/0337365 A1    Dec. 19, 2013

(30) Foreign Application Priority Data
Jun. 18, 2012 (KR) ........................ 10-2012-0065160

(51) Int. Cl.
| | |
|---|---|
| B01J 32/00 | (2006.01) |
| H01M 4/90 | (2006.01) |
| B01J 37/08 | (2006.01) |
| B01J 27/224 | (2006.01) |
| B01J 35/10 | (2006.01) |
| H01M 4/86 | (2006.01) |
| H01M 4/92 | (2006.01) |
| B01J 37/06 | (2006.01) |

(Continued)

(52) U.S. Cl.
CPC ............ *H01M 4/9083* (2013.01); *B01J 27/224* (2013.01); *B01J 32/00* (2013.01); *B01J 35/1061* (2013.01); *B01J 37/084* (2013.01); *H01M 4/8673* (2013.01); *H01M 4/9075* (2013.01); *H01M 4/925* (2013.01); *B01J 21/18* (2013.01); *B01J 23/42* (2013.01); *B01J 29/0308* (2013.01); *B01J 35/0033* (2013.01); *B01J 37/06* (2013.01); *H01M 8/086* (2013.01); *H01M 8/1011* (2013.01); *H01M 2008/1095* (2013.01)

(58) Field of Classification Search
CPC .... B01J 23/03416; B01J 27/224; B01J 32/00; B01J 35/1061; B01J 35/0033; B01J 37/084; B01J 37/06; B01J 21/18; B01J 23/42; B01J 29/0308; H01M 4/9083
USPC ................................................. 502/416–417
See application file for complete search history.

(56) References Cited

U.S. PATENT DOCUMENTS 3,536,358 A *  10/1970  Masucci ................ 297/342
4,536,358 A *   8/1985  Welsh et al. ............ 264/81
7,910,082 B2 *  3/2011  Dawes et al. ......... 423/346

FOREIGN PATENT DOCUMENTS

| JP | 2004-339048 A | 12/2004 |
| JP | 2010-149008 A | 7/2010 |
| JP | 2011-051866 A | 3/2011 |

OTHER PUBLICATIONS

Krawiec, Piotr, et al. "Ordered mesoporous carbide derived carbons: novel materials for catalysis and adsorption." The Journal of Physical Chemistry C 113.18 (2009): 7755-7761.*

(Continued)

*Primary Examiner* — Richard M Rump
(74) *Attorney, Agent, or Firm* — Cantor Colburn LLP

(57) ABSTRACT

A composite support including: an ordered mesoporous carbon including mesopores having an average diameter of about 2 nanometers to about 8 nanometers; and silicon carbide dispersed in the ordered mesoporous carbon.

16 Claims, 14 Drawing Sheets

(51) Int. Cl.
  *B01J 21/18* (2006.01)
  *B01J 23/42* (2006.01)
  *B01J 29/03* (2006.01)
  *B01J 35/00* (2006.01)
  *H01M 8/08* (2006.01)
  *H01M 8/10* (2006.01)

(56) References Cited

OTHER PUBLICATIONS

Shi, Y. et al. "Ordered Mesoporous SiOC and SiCN Ceramics from Atmosphere-Assisted in Situ Transformation". Chem. Mater., 2007, 19 (7), pp. 1761-1771.*

Yao, Jianfeng, et al. "Role of pores in the carbothermal reduction of carbon-silica nanocomposites into silicon carbide nanostructures." The Journal of Physical Chemistry C 111.2 (2007): 636-641.*

E. P. Barrett, L. G. Joyner, P. P. Halenda, "The determination of pore volume and area distributions in porous substances. I. Computations from nitrogen isotherms", J. Am. Chem. Soc. Jan. 1951, vol. 73, 373-380.

H.Q. LY, R. et al., "Conversion of polycarbosilane (PCS) to SiC-based ceramic Part 1. Characterisation of PCS and curing products", Journal of Materials Science, vol. 36, 2001, pp. 4037-4043.

* cited by examiner

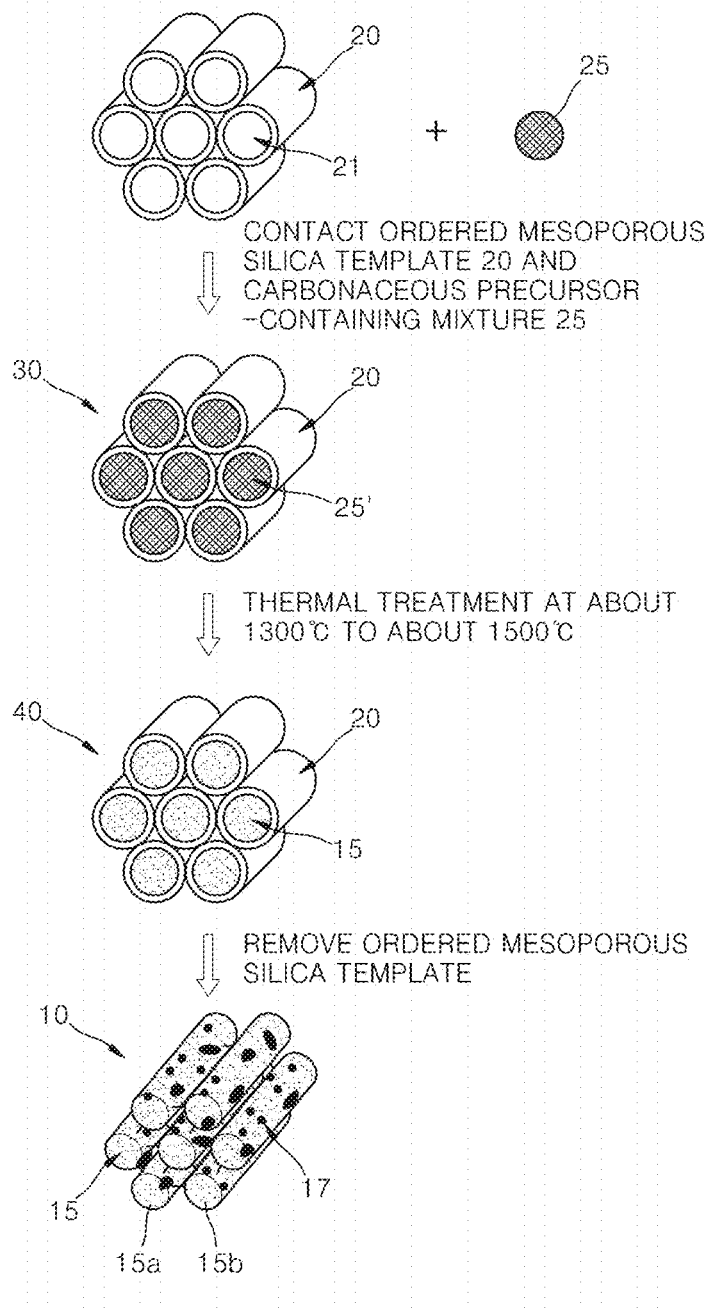

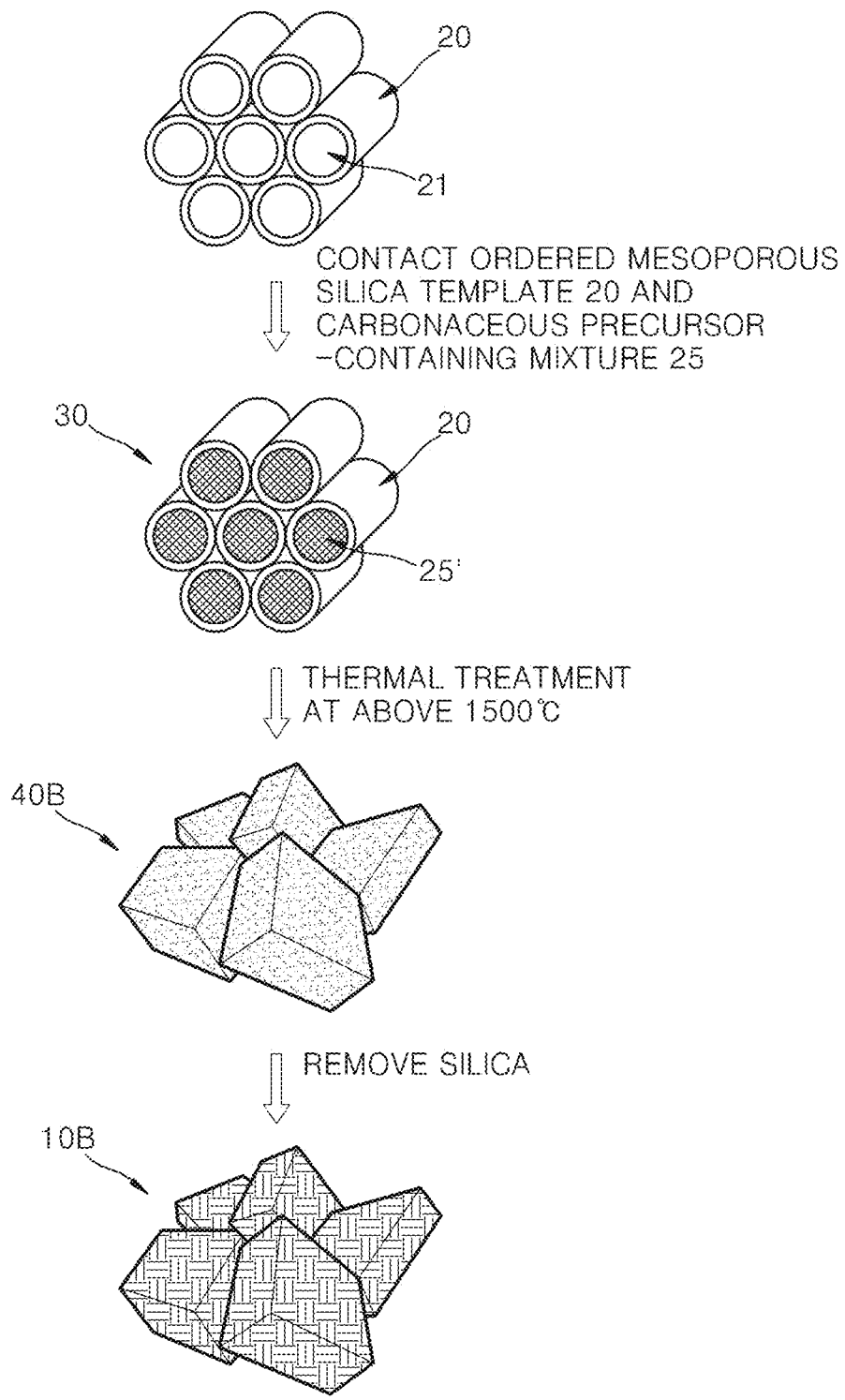

COMPOSITE SUPPORT, METHOD OF PREPARING THE SAME, ELECTRODE CATALYST INCLUDING THE COMPOSITE SUPPORT, AND MEMBRANE-ELECTRODE ASSEMBLY AND FUEL CELL EACH INCLUDING THE ELECTRODE CATALYST

This application claims priority to and the benefit of Korean Patent Application No. 10-2012-0065160, filed on Jun. 18, 2012, and all the benefits accruing therefrom under 35 U.S.C. §119, the content of which is incorporated herein in its entirety by reference.

BACKGROUND

1. Field

The present disclosure relates to a composite support, a method of preparing the same, an electrode catalyst including the support, and a membrane-electrode assembly ("MEA") and a fuel cell that include the electrode catalyst.

2. Description of the Related Art

Proton exchange membrane fuel cells ("PEMFCs") and direct methanol fuel cells ("DMFCs") are power generating systems which generate direct current ("DC") electricity from electrochemical reactions between hydrogen or methanol and oxygen. The PEMFC and DMFC may have an anode to which a fuel in the form of a liquid or gas is supplied, a cathode, and a proton-conducting membrane disposed between the anode and the cathode.

In the anode, protons are generated by a catalyst through oxidization of hydrogen or methanol. These protons pass through the proton-conducting membrane and react with oxygen in the presence of a catalyst at the cathode, thereby generating electricity. Thus because of the role of the catalyst, the performance of the catalyst is central to the performance of the fuel cell.

A PEMFC may employ an amorphous carbon support with dispersed Pt particles both in the anode and the cathode. A DMFC may use a PtRu catalyst in the anode, and a Pt catalyst in the cathode, wherein the catalyst may be in the form of a particulate or dispersed on an amorphous carbon support.

To reduce the cost of a high-quality fuel cell, use of less catalyst and improvement in cell durability are desired. In this regard, there is a need for a support that provides an increased electrochemically active surface of the catalyst particles and improved durability.

SUMMARY

Provided is a composite support with improved electrochemical durability.

Also provided is a method of preparing the composite support.

Also provided is an electrode catalyst including the composite support.

Also provided is a membrane-electrode assembly (MEA) that includes the electrode catalyst.

Also provided is a fuel cell that includes the electrode catalyst.

Additional aspects will be set forth in part in the description which follows and, in part, will be apparent from the description.

According to an aspect, a composite support including an ordered mesoporous carbon including mesopores having an average diameter of about 2 nm to about 8 nm; and a silicon carbide dispersed in the ordered mesoporous carbon is provided.

The ordered mesoporous carbon may have a framework including walls defining the mesopores.

The silicon carbide may be in the form of a particle.

The silicon carbide may be bound to an inner and an outer wall of the framework of the ordered mesoporous carbon.

According to another aspect, a method of preparing a composite support is provided. The method includes: contacting an ordered mesoporous silica template and a carbonaceous precursor-containing mixture to prepare a first mixture; thermally treating the first mixture at a temperature of about 1300° C. to about 1500° C. to form a pre-composite including an ordered mesoporous carbon including mesopores having an average diameter of about 2 nanometers (nm) to about 8 nm, a silicon carbide dispersed in the ordered mesoporous carbon, and the ordered mesoporous silica template; and removing the ordered mesoporous silica template from the pre-composite to prepare the composite support, wherein the composite support includes the ordered mesoporous carbon including mesopores having an average diameter of about 2 nm to about 8 nm and the silicon carbide dispersed in the ordered mesoporous carbon.

The thermally treating of the first mixture may be performed at a temperature of about 1350° C. to about 1450° C.

The thermal treating of the first mixture may be performed in an inert atmosphere.

The silicon carbide in the pre-composite may be derived from the ordered mesoporous silica template and a carbonaceous precursor of the carbonaceous precursor-containing mixture.

The removing of the ordered mesoporous silica template from the pre-composite may include contacting the pre-composite and an acid or an alkali solution capable of dissolving silica.

According to another aspect, an electrode catalyst for a fuel cell, including the composite support; and a catalyst particle loaded on the composite support is provided.

According to another aspect, a membrane-electrode assembly (MEA) for a fuel cell includes: a cathode; an anode disposed opposite to the cathode; and an electrolyte membrane disposed between the cathode and the anode, wherein at least one of the cathode and the anode includes the electrode catalyst is provided.

Also provided is a fuel cell including the membrane-electrode assembly.

BRIEF DESCRIPTION OF THE DRAWINGS

These and/or other aspects will become apparent and more readily appreciated from the following description of the embodiments, taken in conjunction with the accompanying drawings in which:

FIG. 1A is a schematic view illustrating an embodiment of a method of preparing the composite support and an embodiment of the composite support;

FIG. 1C is a schematic view illustrating a method of preparing the support of Comparative Example B and the support of Comparative Example B;

DETAILED DESCRIPTION

Figure 1B:
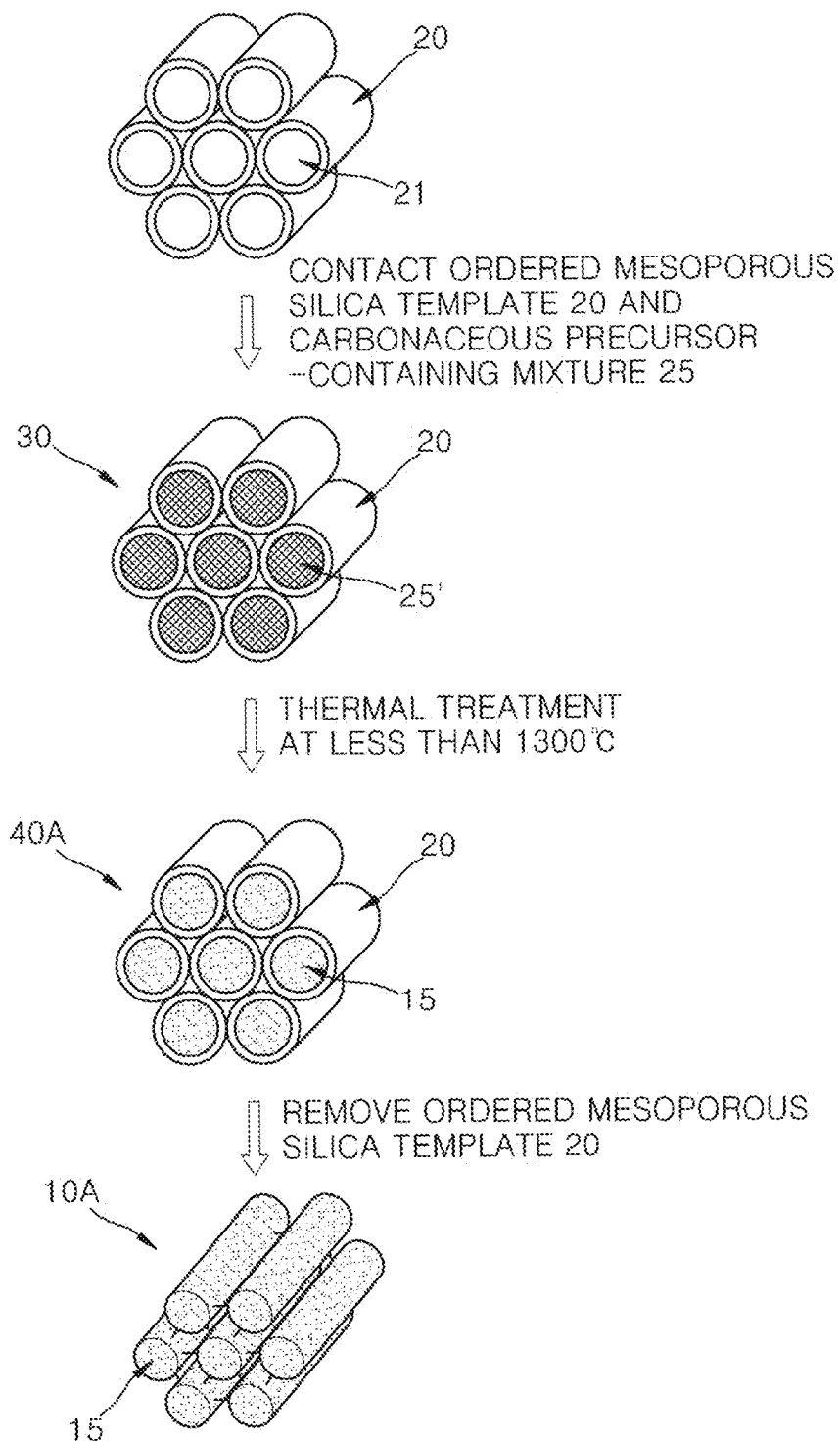
FIG. 1B is a schematic view illustrating a method of preparing the support of Comparative Example A and the support of Comparative Example A.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the present disclosure, a composite support includes an ordered mesoporous carbon comprising mesopores having an average diameter of about 2 nanometers (nm) to about 8 nm; and silicon carbide dispersed in, e.g., disposed on or bound to, the ordered mesoporous carbon.

In an embodiment, the ordered mesoporous carbon may have an average mesopore diameter of about 3 nm to about 7 nm, or about 2 nm to about 3 nm, but is not limited thereto.

The mesopore size may be determined by nitrogen adsorption. In an embodiment of the present disclosure, the mesopore size (e.g., average diameter) and pore distribution characteristics were determined using a Tristar 3000 system (available from Micromeritics), wherein the pore size distribution was obtained from a nitrogen adsorption isotherm using a Barrett-Joyner-Halenda ("BJH") method, as described in E. P. Barrett, L. G. Joyner, P. P. Halenda, The determination of pore volume and area distributions in porous substances. I. Computations from nitrogen isotherms, J. Am. Chem. Soc. (1951), 73, 373-380, the contents of which are incorporated herein by reference in its entirety.

The average pore diameter of the mesopores corresponds to the highest peak level of peaks in the nitrogen adsorption isotherm.

While not wanting to be bound by theory, it is understood that because the mesoporous carbon includes the mesopores as described above, the ordered mesoporous carbon may have a specific surface area that is large enough to support a sufficient amount of catalyst particles and also contributes to facilitating supply of reactants to the catalyst particles and diffusion of reaction products and byproducts from the catalyst particles.

The ordered mesoporous carbon may have a framework with walls defining the mesopores. The framework may have any suitable shape, and may have an interconnected complex porous network.

The ordered mesoporous carbon may further include, in addition to carbon, at least one heteroatom selected from oxygen, nitrogen and sulfur; and/or at least one metal selected from ruthenium (Ru), palladium (Pd), iridium (Ir), iron (Fe), cobalt (Co), molybdenum (Mo), tungsten (W), and nickel (Ni). When the ordered mesoporous carbon further includes a heteroatom as described above, the supply of reactants and diffusion of reaction products in a fuel cell may be facilitated.

The silicon carbide is dispersed in, e.g., disposed on or bound to, the ordered mesoporous carbon. The silicon carbide may be in the form of a particle, and may have any suitable shape and may have, for example, at least one shape selected from a spherical (e.g., formless), platelet, amorphous, and acicular shape. The silicon carbide particles may be bound to an inner surface of a wall of the ordered mesoporous carbon, specifically an inner and/or an outer surface of a wall of the framework of the ordered mesoporous carbon. While not wanting to be bound by theory, it is understood that the configuration of the silicon carbide and the ordered mesoporous carbon can be understood based on the fact that the silicon carbide is derived from a silica template and a carbonaceous precursor-containing mixture that are used to prepare the ordered mesoporous carbon. In particular, if a silicon carbide or a silicon carbide precursor is externally supplied to coat a surface of the ordered mesoporous carbon, the silicon carbide cannot bind to the inner surface of the walls of the mesopores and/or the inner surface of the walls of the framework of the ordered mesoporous carbon. Accordingly, the silicon carbide of the composite support according to the present disclosure is distinct from the silicon carbide added to coat a surface of the ordered mesoporous carbon, or added as a silicon carbide precursor so as to coat the surface of the ordered mesoporous carbon.

The silicon carbide has high chemical and electrochemical stability, and thus may substantially or effectively prevent corrosion and modification of the ordered mesoporous carbon, which is apt to corrode at a voltage which may be applied during operation of a fuel cell. Therefore, the composite support may be advantageous in both the high specific surface area of the ordered mesoporous carbon and the high chemical and electrochemical stability of the silicon carbide, so that an electrode catalyst comprising the composite support may have improved electrochemical performance and improved durability.

The ordered mesoporous carbon and the silicon carbide may be present in a weight ratio of about 1:99 to about 30:70, and in another embodiment, may be present in a weight ratio of about 5:95 to about 40:60. When the weight ratio of the ordered mesoporous carbon to the silicon carbide is within these ranges, the composite support may have a large specific surface area and improved chemical and electrochemical stability. The ordered mesoporous carbon may be present in an amount of about 1 weight percent (wt %) to about 40 wt %, specifically about 5 wt % to about 30 wt %, based on a total weight of the composite support. The silicon carbide may be present in an amount of about 99 wt % to about 60 wt %, specifically about 95 wt % to about 70 wt %, based on a total weight of the composite support.

The composite support may have a Brunauer-Emmett-Teller ("BET") specific surface area of about 300 square meters per gram ($m^2/g$) to about 600 $m^2/g$, specifically about 350 $m^2/g$ to about 550 $m^2/g$, more specifically about 350 $m^2/g$ to about 550 $m^2/g$. While not wanting to be bound by theory, it is understood that the high specific surface area may be attributed to the ordered mesoporous carbon structure of the composite support.

A method of preparing a composite support 10, according to an embodiment of the present disclosure, is described below with reference to FIG. 1A.

First, an ordered mesoporous silica template 20 is contacted (e.g., mixed) with a carbonaceous precursor-containing mixture 25 to prepare a first mixture 30 including the ordered mesoporous silica template 20 with mesopores 21 filled with a pre-heated product 25' of the carbonaceous precursor-containing mixture 25.

The ordered mesoporous silica template 20 may be any suitable molecular sieve material having a structure of interconnected primary micropores, but is not limited thereto. Non-limiting examples of molecular sieve materials with a 3-dimensional connection structure include at least one selected from MCM-48, which has a cubic structure, SBA-1, which has a cubic structure, SBA-15, which has a hexagonal structure, KIT-1 which has an irregular 3-dimensional structure of connected pores, MSU-1, but are not limited thereto, and may be any of a variety of mesoporous molecular sieve materials having a structure of interconnected primary micropores. Other examples of molecular sieve materials may include MCM-41, HSM, MCM-22 (also known as MWW), and MFI (also known as ZSM-5).

The ordered mesoporous silica template 20 may be prepared using any suitable method, the details of which could be determined by one of skill in the art without undue experimentation.

For example, SAB-15 may be hydrothermally synthesized via hydrolysis and condensation of tetraethylorthosilicate ("TEOS") using an aqueous solution of the surfactant Pluronic P123 (available from BASF) as an organic template, and an acid catalyst. In particular, after adding TEOS into an aqueous hydrochloric acid solution containing the dissolved surfactant Pluronic P123 at a particular temperature (for example, at a temperature of about 5° C. to about 80° C.), hydrolysis and a condensation reaction (for example, condensation for about 6 hours to about 24 hours), and then hydrothermal synthesis (for example, at a temperature of about 80° C. to about 180° C. for about 6 hours to 48 hours) may be performed, followed by heating to remove the surfactant, so that SBA-15 (having the space group P6 mm) may be obtained. The SBA-15 may have a pore diameter of about 6 nanometers (nm) to about 10 nm. The pores in the SBA-15 may be interconnected 3-dimensionally by micropores.

The carbonaceous precursor in the carbonaceous precursor-containing mixture 25 may be any suitable material able to form a carbonaceous structure via carbonization as a result of being heated, and is not limited to a particular material. For example, the carbonaceous precursor may be any suitable hydrocarbon, may be a carbohydrate or an organic polymer, and may be at least one selected from glucose, sucrose, fructose, benzene, naphthalene, anthracene, phenanthrene, pyrene, phenol-formaldehyde ("PF") resin, and resorcinol-formaldehyde ("RF") resin. To incorporate a heteroatom such as nitrogen and/or sulfur into an ordered mesoporous carbon 15, a nitrogen-containing carbonaceous precursor and/or a sulfur-containing carbonaceous precursor may be used. Non-limiting examples of the nitrogen-containing carbonaceous precursor include at least one selected from urea-formaldehyde ("UF") resin, quinoxaline, propylenediamine, 4,4'-dipyridyl, and phenanthroline. Non-limiting examples of the sulfur-containing carbonaceous precursor include at least one selected from p-toluenesulfonic acid and furfuryl mercaptan. The sulfur-containing carbonaceous precursor may also serve as a carbonization catalyst. In an embodiment, the carbonaceous precursor includes a single compound, and in another embodiment includes a plurality compounds, but is not limited thereto.

When the sulfur-containing carbonaceous precursor is used along with the nitrogen-containing carbonaceous precursor, an amount of the sulfur-containing carbonaceous precursor may be from about 30 parts to about 90 parts by weight, specifically about 40 parts to about 80 parts by weight, based on 100 parts by weight of the nitrogen-containing carbonaceous precursor.

The carbonaceous precursor-containing mixture 25 may further include, in addition to a carbonaceous precursor as described above, a metal precursor, and a solvent.

The metal precursor may be at least one selected from ruthenium chloride, molybdenum chloride, iron chloride, and cobalt chloride. When the carbonaceous precursor-containing mixture 25 further includes a metal precursor as described above, the ordered mesoporous carbon 15 may include a metal.

The solvent may be any suitable solvent capable of uniformly suspending and/or dissolving the carbonaceous precursor. Also, if the metal precursor is present, the suitable solvent may be capable of dissolving and/or suspending the metal precursor. Non-limiting examples of the solvent include at least one selected from water, an alcohol, a ketone, an ether, an ester, and an amide. Specifically, the solvent may comprise at least one selected from water, acetone, methanol, ethanol, isopropylalcohol, n-propylalcohol, butanol, dimethylacetamide, dimethylformamide, dimethylsulfoxide, N-methyl-2-pyrrolidone ("NMP"), tetrahydrofuran, tetrabutylacetate, n-butylacetate, m-cresol, toluene, ethylene glycol, γ-butyrolactone, and hexafluoroisopropanol ("HFIP"). These materials may be used alone or in combination.

The contacting of the carbonaceous precursor-containing mixture 25 and the ordered mesoporous silica template 20 may include impregnating the carbonaceous precursor-containing mixture 25 in the ordered mesoporous silica template 20, and pre-heating.

An amount of the ordered mesoporous silica template 20 impregnated with the carbonaceous precursor-containing mixture 25 may be about 0.5 parts to about 30 parts by weight, specifically about 1 parts to about 25 parts by weight, more specifically about 2 parts to about 20 parts by weight, based on 100 parts by weight of the carbonaceous precursor-containing mixture 25. When the amount of the ordered mesoporous silica template 20 is within this range, a sufficient amount of the carbonaceous precursor-containing mixture 25 may be disposed in mesopores 21 of the ordered mesoporous silica template 20.

A temperature at which the ordered mesoporous silica template 20 is impregnated into the carbonaceous precursor-containing mixture 25 may be room temperature, for example, about 20° C. to about 25° C., but is not limited thereto.

After the ordered mesoporous silica template 20 is impregnated into the carbonaceous precursor-containing mixture 25, the ordered mesoporous silica template 20 with the carbonaceous precursor-containing mixture 25 may be dried, for example, at room temperature (e.g., 20° C.) and in air, or at reduced pressure if desired, to remove at least a portion of the solvent from the carbonaceous precursor-containing mixture 25.

After the impregnating of the ordered mesoporous silica template 20 into the carbonaceous precursor-containing mixture 25, pre-heating may be performed. The pre-heating may be performed at a temperature of about 50° C. to about 500° C., and in an embodiment, at about 75° C. to about 400° C. When the pre-heating temperature is within these ranges, the ordered mesoporous carbon 15 of the composite support 10 may have suitable uniformity.

The pre-heating may be performed in two steps. For example, first pre-heating may be performed at a temperature of about 50° C. to about 150° C., and second pre-heating may be performed at a temperature of about 150° C. to about 500° C. This may form a structure of the ordered mesoporous carbon 15, fully removing a solvent from a pre-heated product 25' of the carbonaceous precursor-containing mixture 25 filled in the mesopores 21.

The above-described contacting (e.g., impregnating and pre-heating) of the ordered mesoporous silica template 20 and the carbonaceous precursor-containing mixture 25 may be repeated if desired, e.g. repeated 2 to about 10 times.

Subsequently, the first mixture 30, including the ordered mesoporous silica template 20, in which the mesopores 21 are filled with the pre-heated product 25' from the carbonaceous precursor-containing mixture 25, may be thermally treated (e.g., carbonized) at a temperature of about 1300° C. to about 1500° C., to form a pre-composite 40, which includes the ordered mesoporous carbon 15 having mesopores of an average diameter of about 2 nm to about 8 nm, the silicon carbide bound to the ordered mesoporous carbon 15, and the ordered mesoporous silica template 20.

Although not illustrated in FIG. 1A, silicon carbide derived from the carbonaceous precursor of the carbonaceous precursor-containing mixture 25 and the ordered mesoporous silica template 20 may be disposed between an outer surface of a wall of the ordered mesoporous carbon 15, which has the mesopores having an average diameter of about 2 nm to about 8 nm, and an inner surface of a wall of the mesopores 21 of the ordered mesoporous silica template 20.

Subsequently, the ordered mesoporous silica template 20 may be removed from the pre-composite 40, which includes the ordered mesoporous carbon 15 with the mesopores having an average diameter of about 2 nm to about 8 nm, silicon carbide 17 bound to the ordered mesoporous carbon 15, and the ordered mesoporous silica template 20, to obtain the composite support 10, which includes the ordered mesoporous carbon 15 with the mesopores having an average diameter of about 2 nm to about 8 nm and the silicon carbide 17 bound to the ordered mesoporous carbon 15. The silicon carbide 17 may be in the form of particles having any suitable shape, e.g., comprising at least one selected from a spherical, platelet, amorphous, and an acicular shape, which may be bound to the inner surface of the wall of the mesopores of the ordered mesoporous carbon 15, and/or to an inner and/or an outer surface of the walls of the framework of the ordered mesoporous carbon 15. For example, the silicon carbide 17 may be disposed (e.g. bound) between adjacent ordered mesoporous carbon frameworks 15a and 15b of the composite support 10, and may be disposed on an inner surface of the ordered mesoporous carbon.

A thermal treatment temperature of the first mixture 30 may be from about 1300° C. to about 1500° C., and in an embodiment, may be about 1350° C. to about 1450° C. If the thermal treatment temperature of the first mixture 30 is lower than about 1300° C., the silicon carbide 17 may not form in the pre-composite 40. If the thermal treatment temperature of the first mixture 30 is above 1500° C., the mesoporous structure of the ordered mesoporous silica template 20 may collapse, and the pre-heated product 25' of the carbonaceous precursor-containing mixture 25 may be fully converted into silicon carbide 17.

FIG. 1B is a schematic view illustrating a support 10A obtained when a thermal treatment temperature of the first mixture 30 is lower than about 1300° C. Referring to FIG. 1B, when the first mixture 30 is thermally treated at a temperature of less than 1300° C., a pre-composite 40A, which includes the ordered mesoporous carbon 15 with the mesopores having an average diameter of about 2 nm and about 8 nm, and the ordered mesoporous silica template 20, may be obtained. After the ordered mesoporous silica template 20 is removed from the pre-composite 40A, the support 10A, which includes the ordered mesoporous carbon 15 with the mesopores having an average diameter of about 2 nm to about 8 nm, may be obtained. That is, when the thermal treatment temperature of the first mixture 30 is less than about 1300° C., the resulting ordered mesoporous carbon 15 does not include silicon carbide. This will be described later in greater detail with reference to a support A in Comparative Example A.

FIG. 1C is a schematic view illustrating a support 10B obtained when a thermal treatment temperature of the first mixture 30 is above 1500° C. Referring to FIG. 1C, when the first mixture 30 is thermally treated at a temperature of above 1500° C., a pre-composite 40B, including silicon carbide and silica, may be obtained. After the silica is removed from the pre-composite 40B, the support 10B, including only the silicon carbide, may be obtained. That is, when the thermal treatment temperature of the first mixture 30 is above 1500° C., the mesoporous structure of the ordered mesoporous silica template 20 may collapse, and the pre-heated product 25' of the carbonaceous precursor-containing mixture 25 may be fully converted into the silicon carbide. This will be described later in greater detail with reference to a support B in Comparative Example B.

The thermal treatment of the first mixture 30 may be performed in an inert atmosphere, for example, in a vacuum, or in an atmosphere comprising an inert gas such as at least one selected from a nitrogen, argon, and helium.

The solvent capable of selectively dissolving the ordered mesoporous silica template 20 from the pre-composite 40, which includes the ordered mesoporous carbon 15 with the mesopores having an average diameter of about 2 nm to about 8 nm, the silicon carbide 17 bound to the ordered mesoporous carbon 15, and the ordered mesoporous silica template 20, may be an acid or an alkali solution able to dissolve silica. The solvent that can selectively dissolve the ordered mesoporous silica template 20 may comprise, for example, an aqueous hydrofluoric acid (HF) solution, or an aqueous sodium hydroxide (NaOH) solution. The concentration of the acid, e.g., the aqueous HF solution, may be about 5 wt % to about 98 wt %, specifically about 5 wt % to about 47 wt %, based on a total weight of the solution, and the concentration of the aqueous alkali solution, e.g., the aqueous NaOH solution, may be about 3 wt % to about 50 wt %, specifically 5 wt % to about 30 wt %, based on a total weight of the solution.

While not wanting to be bound by theory, it is understood that the ordered mesoporous silica can become a water-soluble silicate through alkali melting or carbonate dissociation, which may then react with HF to form $SiF_4$ that is apt to erode. As a result of the selective removing of the ordered mesoporous silica template 20, the composite support 10 may be obtained.

According to a characteristic of the ordered mesoporous carbon 15 of the composite support 10, the mesopores thereof are regularly arranged. This characteristic may be identified using X-ray diffraction ("XRD") analysis.

While available amorphous microporous carbon powder only includes micropores, the ordered mesoporous carbon 15 in the composite support 10 includes both mesopores and micropores in an appropriate ratio. According to the International Union of Pure and Applied Chemistry (IUPAC), a micropore is defined as a pore of less than about 2 nm in diameter, and a mesopore is defined as a pore of about 2 to 50 nm in diameter.

In an embodiment, when loaded with catalyst particles, the composite support described above may be used as an electrode catalyst, for example, and may be suitable for use in a fuel cell.

The catalyst particle disposed, e.g., loaded on, the composite support may be any catalyst particle suitable for use in a fuel cell, the details of which can be determined by one of skill in the art without undue experimentation. The catalyst particle may include at least one selected from platinum (Pt), palladium (Pd), iridium (Ir), ruthenium (Ru), manganese (Mn), cobalt (Co), copper (Cu), iron (Fe), nickel (Ni), and molybdenum (Mo), but is not limited thereto.

Any suitable method may be used to dispose, e.g., load, catalyst particles onto the composite support. For example, first, a mixture of the composite support and a catalyst precursor may be prepared. The mixture may further include, in addition to the above-described composite support and catalyst precursor, a solvent which is miscible with, able to dissolve, and/or suitable to suspend the composite support and the catalyst precursor. Non-limiting examples of the solvent include at least one selected from a glycolic solvent, such as at least one selected from ethylene glycol, 1,2-propylene glycol, 1,3-butandiol, 1,4-butandiol, neopentyl glycol, diethyleneglycol, 3-methyl-1,5-pentanediol, 1,6-hexanediol, and trimethylol propane; a mono-ol (i.e., an alcohol having a single hydroxyl group), such as at least one selected from methanol, ethanol, isopropyl alcohol ("IPA"), and butanol; and water. Any solvent capable of being miscible with the catalyst precursor may be used.

The mixture may further include a chelating agent (for example, ethylene diamine tetraacetic acid ("EDTA")) capable of reducing the catalyst precursor, a pH adjuster (for example, an aqueous NaOH solution), or the like.

Subsequently, the catalyst precursor in the mixture may be reduced, thereby resulting in an electrode catalyst with the catalyst particle loaded on the composite support.

The reducing of the catalyst precursor in the mixture may include adding a reducing agent into the mixture. In an embodiment, the reducing of the catalyst precursor in the mixture may include drying the mixture (for example, drying under reduced pressure) to obtain a composite support with the loaded catalyst precursor, and thermally treating the composite support with the loaded catalyst precursor (for example, in a gas reducing furnace) in a reducing atmosphere (for example, in a hydrogen atmosphere).

The reducing agent may be a material capable of reducing the catalyst precursors in the mixture. Non-limiting examples of the reducing agent include at least one selected from hydrazine ($NH_2NH_2$), sodium borohydride ($NaBH_4$), and formic acid. An amount of the reducing agent may be from about 1 mole to about 3 moles, specifically about 1.5 moles to about 2.5 moles, based on 1 mole of the catalyst precursor. When the amount of the reducing agent is within this range, a satisfactory reduction reaction may be induced.

The thermal treating of the composite support with the loaded catalyst precursor in a reducing atmosphere may be performed at a temperature of about 100° C. to about 500° C., and in an embodiment, at a temperature of about 150° C. to about 450° C., but is not limited thereto.

According to another aspect of the present disclosure, a membrane-electrode assembly ("MEA") for a fuel cell includes a cathode and an anode that are disposed opposite to each other, and an electrolyte membrane disposed between the cathode and the anode, wherein at least one of the cathode and the anode includes the above-described electrode catalyst for a fuel cell. In an embodiment, the anode in the MEA may include the electrode catalyst.

According to another aspect of the present disclosure, a fuel cell includes the MEA. Separators may be disposed on opposite surfaces of the MEA, respectively. The MEA may include a cathode, an anode, and an electrolyte membrane disposed between the cathode and the anode, wherein at least one of the cathode and the anode includes the above-described electrode catalyst. The anode of the MEA may include the electrode catalyst.

The fuel cell may be implemented as, for example, a polymer electrolyte membrane fuel cell ("PEMFC"), a phosphoric acid fuel cell ("PAFC"), or a direct methanol fuel cell ("DMFC").

Figure 2:
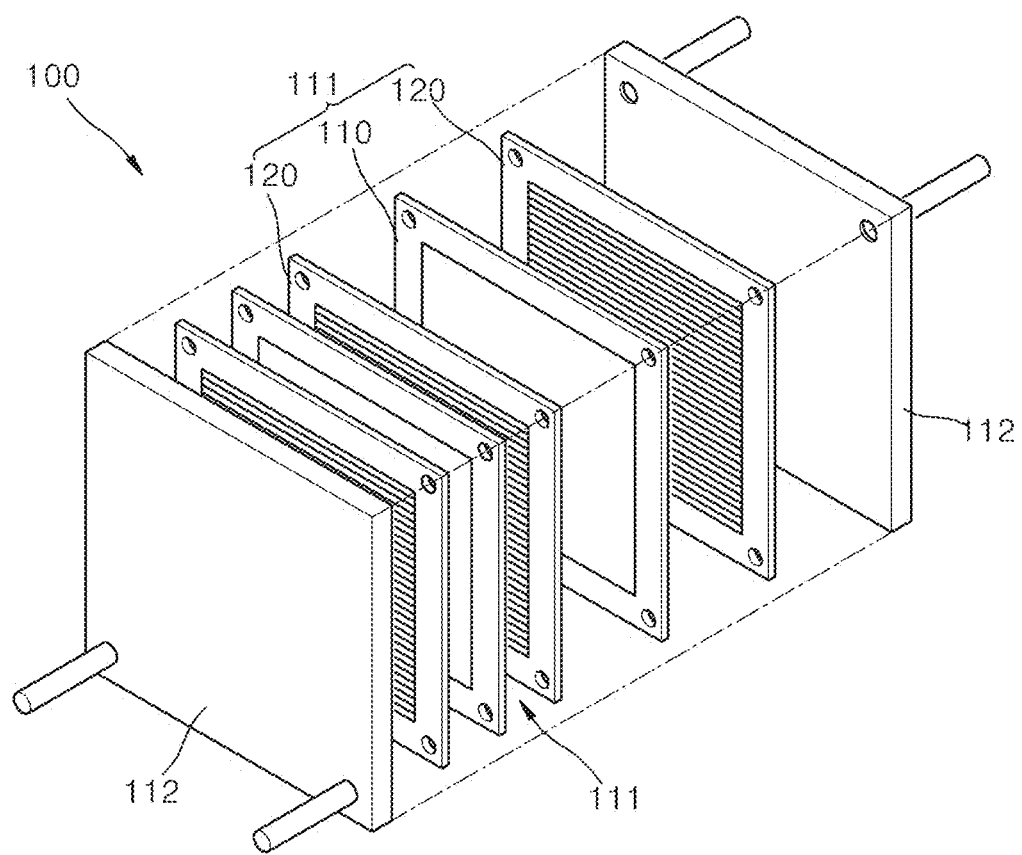
FIG. 2 is an exploded perspective view of an embodiment of a fuel cell.

FIG. 2 is an exploded perspective view of an embodiment of a fuel cell 100, and

Figure 3:
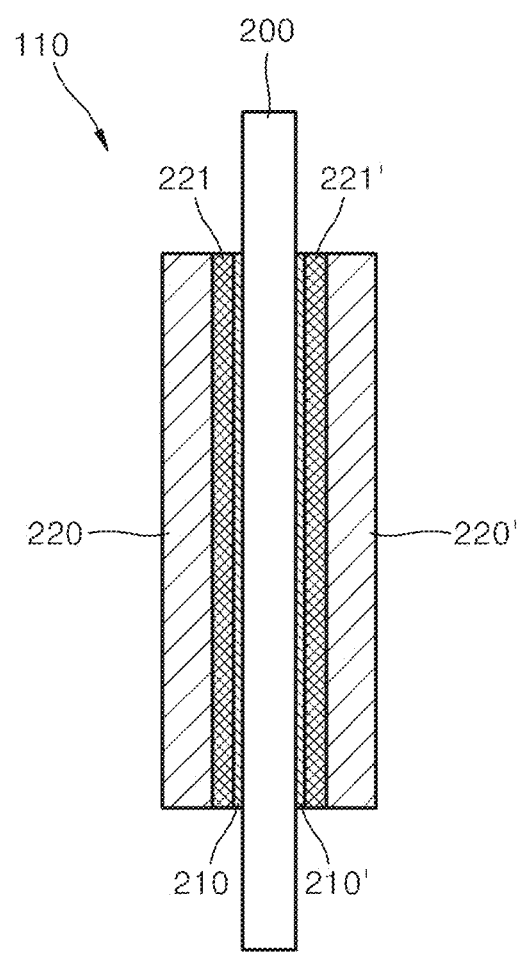
FIG. 3 is a cross-sectional diagram of an embodiment of a membrane-electrode assembly ("MEA") of the fuel cell of FIG. 2.

FIG. 3 is a cross-sectional diagram of an embodiment of a MEA 110 of the fuel cell 100 of FIG. 2.

Referring to FIG. 2, the fuel cell 100 includes a unit cell 111 that is supported by a pair of holders 112. The unit cell 111 includes the MEA 110, and bipolar plates 120 disposed on opposite lateral sides of the MEA 110. Each bipolar plate 120 includes a conductive metal, carbon, and the like, operates as a current collector when in contact with the MEA 110, and provides oxygen and fuel to the catalyst layers of the MEA 110.

Although only two unit cells 111 are shown in FIG. 2, the number of unit cells is not limited, and a fuel cell may have several tens or hundreds of unit cells, e.g., 1 to about 1000 cells, depending on the desired properties of the fuel cell.

Referring to FIG. 3, each MEA 110 includes an electrolyte membrane 200; first and second catalyst layers 210 and 210' respectively disposed on opposite sides of the electrolyte membrane 100 in the thickness direction thereof, wherein one of the first and second catalyst layers 210 and 210' includes the electrode catalyst according to an embodiment of the present disclosure; first and second primary gas diffusion layers 221 and 221' respectively stacked on the first and second catalyst layers 110 and 110'; and first and second secondary gas diffusion layers 220 and 220' respectively stacked on the first and second primary gas diffusion layers 221 and 221'.

The first and second catalyst layers 210 and 210' respectively operate as a fuel electrode and an oxygen electrode, each including a catalyst and a binder therein. The first and second catalyst layers 110 and 110' may further include a material that may increase the electrochemical surface area of the catalyst.

The first and second primary gas diffusion layers 221 and 221' and the first and second secondary gas diffusion layers 220 and 220' may each comprise a conductive porous material such as, for example, at least one selected from carbon sheet, carbon paper, and carbon cloth. The first and second primary gas diffusion layers 221 and 221' and the first and second secondary gas diffusion layers 220 and 220' may diffuse oxygen and fuel supplied through the bipolar plates 120 into the entire surfaces of the first and second catalyst layers 210 and 210'.

The fuel cell 100 including the MEA 110 may operate at a temperature of about 100° C. to 300° C. A fuel, such as hydrogen, is supplied through a first side of the bipolar plate 120 into the first catalyst layer 210, and an oxidant such as oxygen is supplied through the other side of the bipolar plate 120 into the second catalyst layer 210'. Then, hydrogen is oxidized into protons ($H^+$) in the first catalyst layer 210 first catalyst layer, and the protons are conducted to the second catalyst layer 210' through the electrolyte membrane 200. Then, the protons electrochemically react with oxygen in the second catalyst layer 210' second catalyst layer to produce water ($H_2O$) and generate electrical energy. Hydrogen produced from the reforming of a hydrocarbon or an alcohol may be used as the fuel. Oxygen as the oxidant may be supplied in the form of air.

An embodiment will now be described in more detail with reference to the following examples. However, these examples are for illustrative purposes only and shall not limit the scope of the disclosed embodiment.

COMPARATIVE EXAMPLE A

Preparation of Support A

1) Preparation of Ordered Mesoporous Silica Template 23.4 grams (g) of the surfactant Pluronic P123 (BASF) was mixed with 606.8 g of water and 146.4 g of a hydrochloric acid solution (35%, Aldrich), and then tetraethyl orthosilicate ("TEOS") was added into the mixture at about 55° C., followed by a hydrolysis and condensation reaction for about 6 hours. A resulting reaction product was heated at about 500° C. to remove the surfactant from the reaction product, thereby obtaining an ordered mesoporous silica template SBA-15 (having the space group P6 mm).

2) Preparation of Carbonaceous Precursor-containing Mixture

Phenanthroline as a carbonaceous precursor and N-methyl-2-pyrolidon ("NMP") as a solvent were mixed to prepare a carbonaceous precursor-containing mixture.

3) Preparation of First Mixture of Ordered Mesoporous Silica Template with Mesopores Filled with a Pre-heated Product of the Carbonaceous Precursor-containing Mixture The ordered mesoporous silica template and the carbonaceous precursor-containing mixture were put into a Teflon® bottle, which was then shaken to contact the ordered mesoporous silica template and the carbonaceous precursor-containing mixture, followed by first pre-heating the shaken mixture in an oven at about 160° C. for 6 hours in order to dry the shaken mixture and obtain an oligomer of the carbonaceous precursor. Then a second pre-heating was performed (by increasing the temperature from room temperature to about 400° C. for about 4 hours, and then maintaining at about 400° C. for about 2 hours), thereby preparing a first mixture of the ordered mesoporous silica template with mesopores filled with the pre-heated product of the carbonaceous precursor-containing mixture.

4) Preparation of Pre-composite by Thermal Treatment of the First Mixture

Thermal treatment (while the temperature was increased from about 400° C. to about 900° C. over 5 hours, and then maintained at about 900° C. for 2 hours) was performed on the first mixture in a nitrogen atmosphere to obtain a pre-composite A (a composite of the ordered mesoporous carbon and the ordered mesoporous silica template).

5) Removal of Ordered Mesoporous Silica Template from Pre-composite

To selectively dissolve only the ordered mesoporous silica template from the pre-composite A, the pre-composite A was washed with a 5 wt % aqueous HF solution four times, so that a support A (including ordered mesoporous carbon) was obtained.

EXAMPLES 1

Preparation of Composite Support 1

A composite support 1 (a composite of the ordered mesoporous carbon and the silicon carbide) was prepared in the same manner as in Comparative Example A, except that the thermal treatment of the first mixture to prepare the pre-composite was performed by increasing the temperature from about 400° C. to about 1350° C. over about 5 hours, and then maintaining the temperature at about 1350° C. for about 2 hours to obtain a pre-composite 1 (a composite of the ordered mesoporous carbon-silicon carbide-ordered mesoporous silica template), and then the ordered mesoporous silica template was removed from the pre-composite 1 with 5 wt % aqueous HF.

EXAMPLE 2

Preparation of Composite Support 2

A composite support 2 (a composite of the ordered mesoporous carbon and the silicon carbide) was prepared in the same manner as in Comparative Example A, except that the thermal treatment of the first mixture to prepare the pre-composite was performed by increasing the temperature from about 400° C. to about 1400° C. over about 5 hours, and then maintaining the temperature at about 1400° C. for about 2 hours to obtain a pre-composite 2 (a composite of the ordered mesoporous carbon-silicon carbide-ordered mesoporous silica template), and then ordered mesoporous silica template was removed from the pre-composite 2 with 5 wt % aqueous HF.

EXAMPLE 3

Preparation of Composite Support 3

A composite support 3 (a composite of the ordered mesoporous carbon and the silicon carbide) was prepared in the same manner as in Comparative Example A, except that the thermal treatment of the first mixture to prepare the pre-composite was performed by increasing the temperature from about 400° C. to about 1450° C. over about 5 hours, and then maintaining the temperature at about 1450° C. for about 2 hours to obtain a pre-composite 3 (a composite of the ordered mesoporous carbon-silicon carbide-ordered mesoporous silica template), and then ordered mesoporous silica template was removed from the pre-composite 3 with 5 wt % aqueous HF.

COMPARATIVE EXAMPLE B

Preparation of Support B

A support B (including only silicon carbide) was prepared in the same manner as in Comparative Example A, except that the thermal treatment of the first mixture to prepare the pre-composite was performed by increasing the temperature from about 400° C. to about 1600° C. over about 5 hours, and then maintaining the temperature at about 1600° C. for about 2 hours to obtain a pre-composite B (a composite of silicon carbide and silica), and the silica was removed from the pre-composite B with 5 wt % aqueous HF.

Comparative Example A, Examples 1 to 3, and Comparative Example B described above are summarized in Table 1:

TABLE 1

| | Thermal treatment Temperature (° C.) | Pre-composite resulting from thermal treatment | Support resulting from acid-treatment of the pre-composite |
|---|---|---|---|
| Comparative Example A | 900 | Pre-composite A (a composite of ordered mesoporous carbon and ordered mesoporous silica template) | Support A (ordered mesoporous carbon) |
| Example 1 | 1350 | Pre-composite 1 (a composite of ordered mesoporous carbon, silicon carbide, and ordered mesoporous silica template) | Composite support 1 (a composite of ordered mesoporous carbon and silicon carbide) |
| Example 2 | 1400 | Pre-composite 2 (a composite of ordered mesoporous carbon, silicon carbide, and ordered mesoporous silica template) | Composite support 2 (a composite of ordered mesoporous carbon and silicon carbide) |
| Example 3 | 1450 | Pre-composite 3 (a composite of ordered mesoporous carbon, silicon carbide, and ordered mesoporous silica template) | Composite support 3 (a composite of ordered mesoporous carbon and silicon carbide) |
| Comparative Example B | 1600 | Pre-composite B (a composite of silicon carbide and silica) | Support B (Silicon carbide) |

EVALUATION EXAMPLE 1

XRD Analysis of the Support

XRD analysis was performed on support A (Comparative Example A/Thermal treatment temperature: 900° C.), composite support 1 (Example 1/Thermal treatment temperature: 1350° C.), composite support 2 (Example 2/Thermal treatment temperature: 1400° C.), composite support 3 (Example 3/Thermal treatment temperature: 1450° C.), and support B (Comparative Example B/Thermal treatment temperature: 1600° C.) using an XRD system (MP-XRD, Xpert PRO, Philips, Power: 3 kW). The results are shown in FIGS. 4A (which shows 10° to 70° 2θ) and 4B (which shows 14° to 49° 2θ).

Figure 4A:
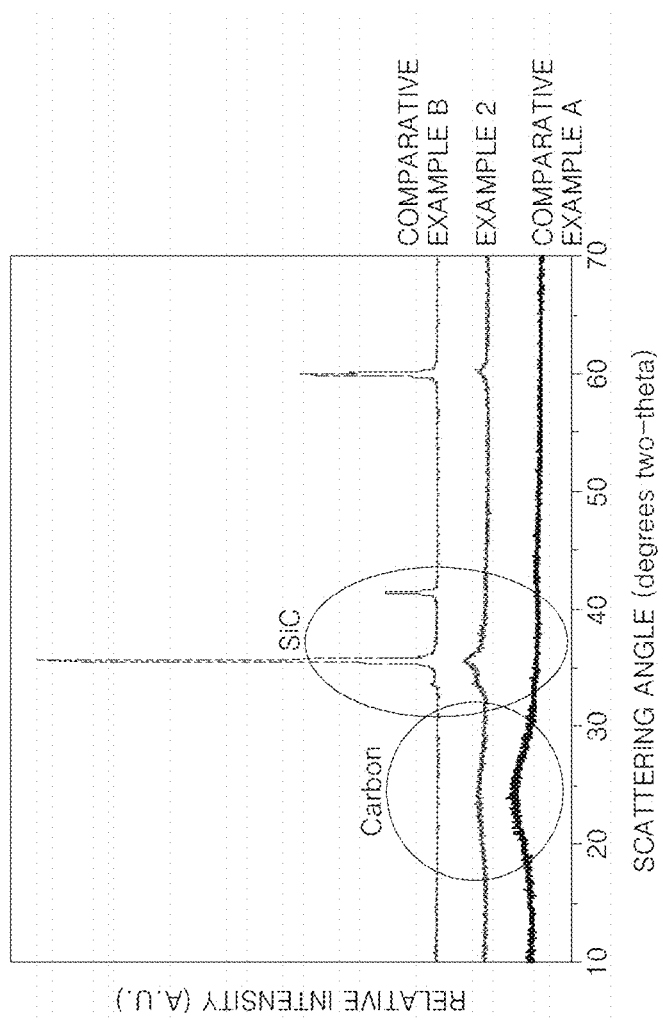
FIGS. 4A and 4B are graphs of relative intensity (arbitrary units) versus scattering angle (degrees 2-theta) illustrating the results of X-ray diffraction ("XRD") analysis of the supports of Comparative Example A, Examples 1 to 3, and Comparative Example B.
Figure 4B:
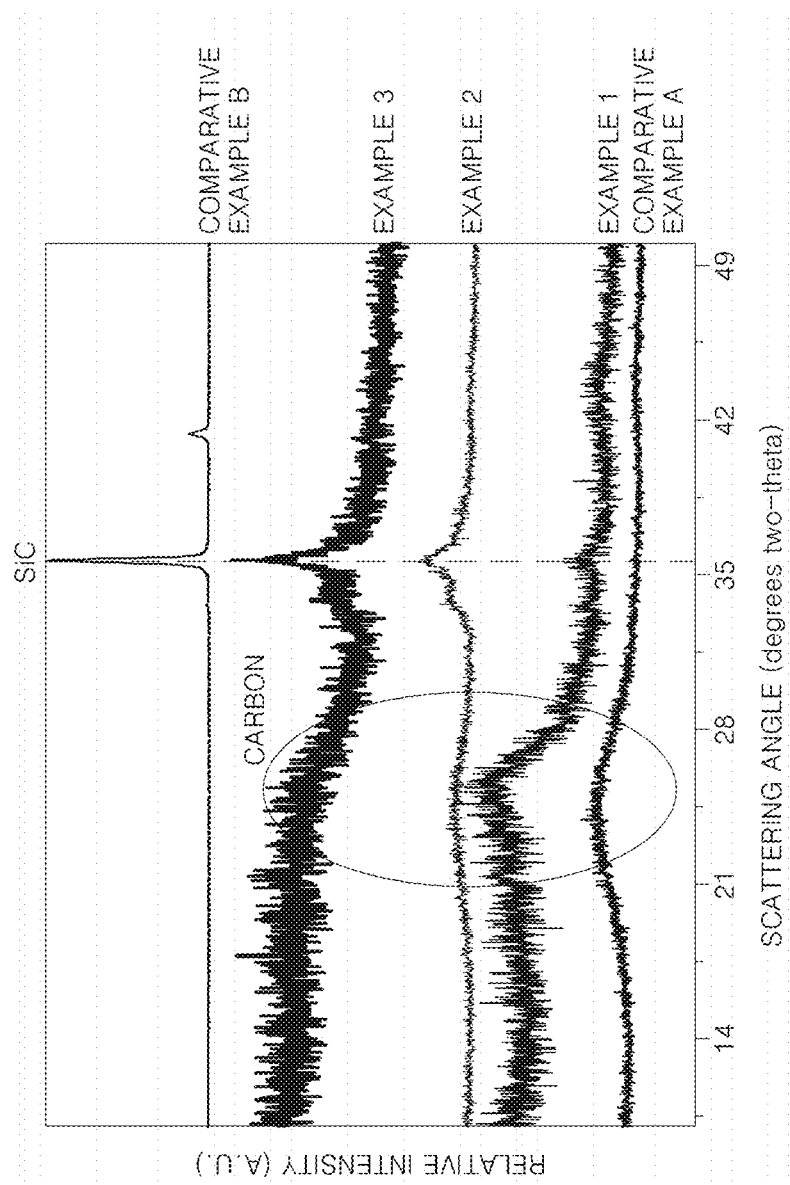

Referring to FIGS. 4A and 4B, the support A was found to have only a carbon peak, and the support B was found to have only a silicon carbide peak, while the composite supports 1, 2, and 3 were found to have both a carbon peak and a silicon carbide peak.

EVALUATION EXAMPLE 2

Fourier Transform Infrared ("FT-IR") Spectroscopic Analysis of the Support

FT-IR spectroscopic analysis was performed on support A (Comparative Example A/Thermal treatment temperature: 900° C.), composite support 1 (Example 1/Thermal treatment temperature: 1350° C.), composite support 2 (Example 2/Thermal treatment temperature: 1400° C.), composite support 3 (Example 3/Thermal treatment temperature: 1450° C.), and support B (Comparative Example B/Thermal treatment temperature: 1600° C.) using a Tensor 27 (Bruker Optics, attenuated total reflectance accessory). The results are shown in FIG. 5.

Figure 5:
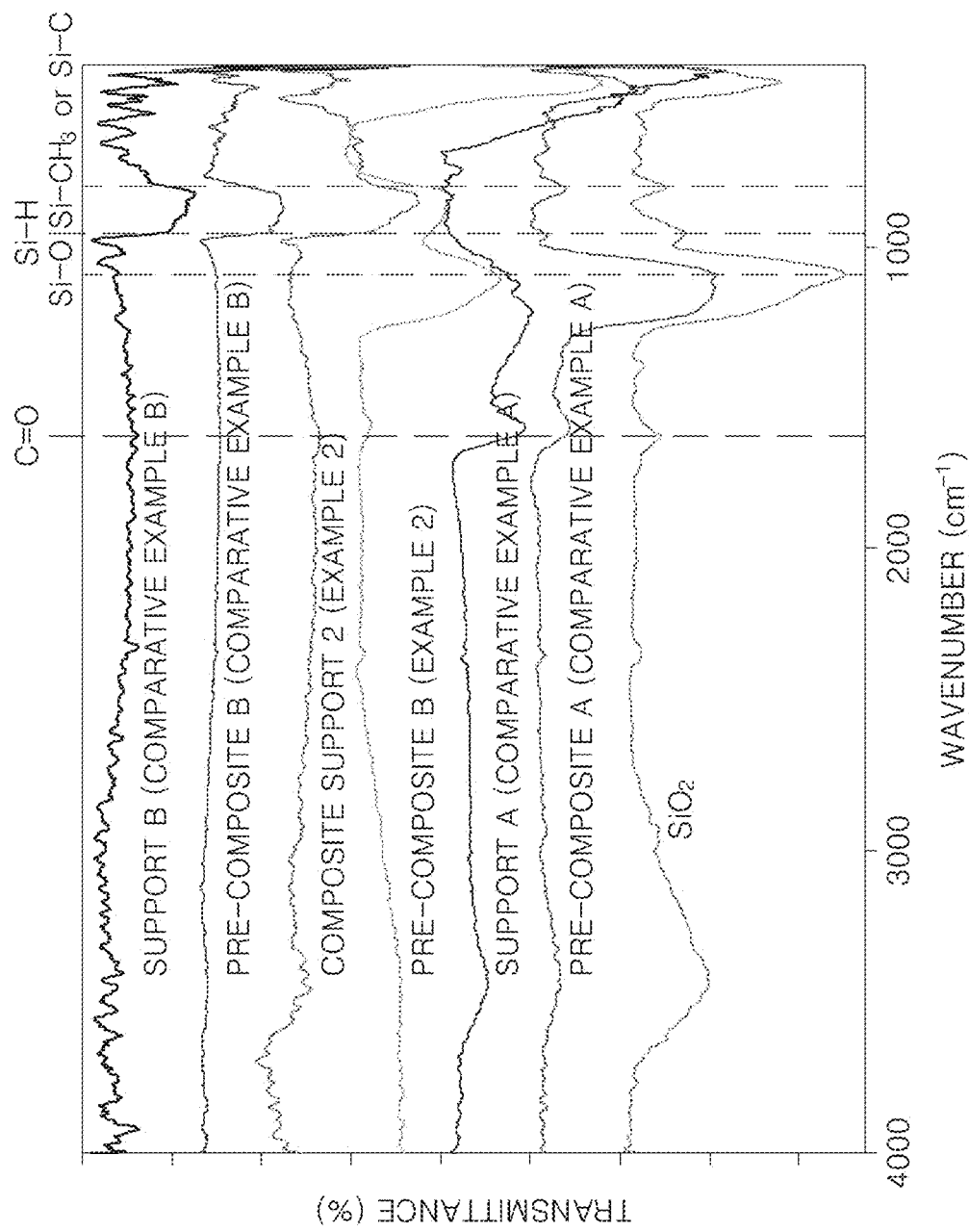
FIG. 5 is a graph of transmittance (percent, %) versus wavenumber (centimeters$^{-1}$, cm$^{-1}$) illustrating the results of Fourier-Transform Infrared ("FT-IR") spectroscopic analysis of the pre-composites and the supports of Comparative Examples A and B, and Example 2.

Referring to FIG. 5, the composite support 2 and the pre-composite 2 (Example 2) were found to have both a carbon peak and a silicon carbide peak.

EVALUATION EXAMPLE 3

Specific Surface Area and Pore Size Analysis on Support

A nitrogen adsorption test was performed on support A (Comparative Example A/Thermal treatment temperature: 900° C.), composite support 1 (Example 1/Thermal treatment temperature: 1350° C.), composite support 2 (Example 2/Thermal treatment temperature: 1400° C.), composite support 3 (Example 3/Thermal treatment temperature: 1450° C.), and support B (Comparative Example B/Thermal treatment temperature: 1600° C.).

In the nitrogen adsorption test, after adsorption and desorption of nitrogen on and from each support, a specific surface and a pore volume of the each support were calculated from a difference between adsorbed and desorbed nitrogen amounts, and a pore size distribution was obtained therefrom. In particular, specific surface areas of pores were calculated based on $N_2$ adsorption-desorption isotherms obtained from the nitrogen adsorption test by the BET method. A total power volume was directly read on the Y-axis of the $N_2$ adsorption-desorption isotherms, and a power size distribution was estimated using the BJH method. The results are shown in Table 2:

TABLE 2

| | Thermal treatment temperature for pre-composite formation (° C.) | Specific surface area ($m^2/g$) | Pore size (nm) |
|---|---|---|---|
| Comparative Example A (Support A) | 900 | 710 | 2.8 |
| Example 1 (Composite support 1) | 1350 | 568 | 2.3 |
| Example 2 (Composite support 2) | 1400 | 552 | 2.3 |
| Example 3 (Composite support 3) | 1450 | 441 | 2.3 |
| Comparative Example B (Support B) | 1600 | 1 | — |

Referring to Table 2, the support A and the composite supports 1, 2, and 3 were found to have mesoporous structures, while the support B does not have a mesoporous structure. This may be attributed to the collapse of the mesoporous structure of the ordered mesoporous silica template during the thermal treatment (at a temperature of 1600° C.) for the pre-composite B formation.

EVALUATION EXAMPLE 4

Observation of Support Using Scanning Electron Microscopy (SEM) with Energy Dispersive X-Ray (SEM-EDX)

The support A (Comparative Example A/Thermal treatment temperature: 900° C.), composite support 1 (Example 1/Thermal treatment temperature: 1350° C.), composite support 2 (Example 2/Thermal treatment temperature: 1400° C.), composite support 3 (Example 3/Thermal treatment temperature: 1450° C.), and support B (Comparative Example B/Thermal treatment temperature: 1600° C.) were observed using SEM. The results are shown in FIGS. 6 to 10. SEM/EDX mapping on the composite support 1 (Example 1/Thermal treatment temperature: 1350° C.) is shown in FIG. 11.

Figure 6:
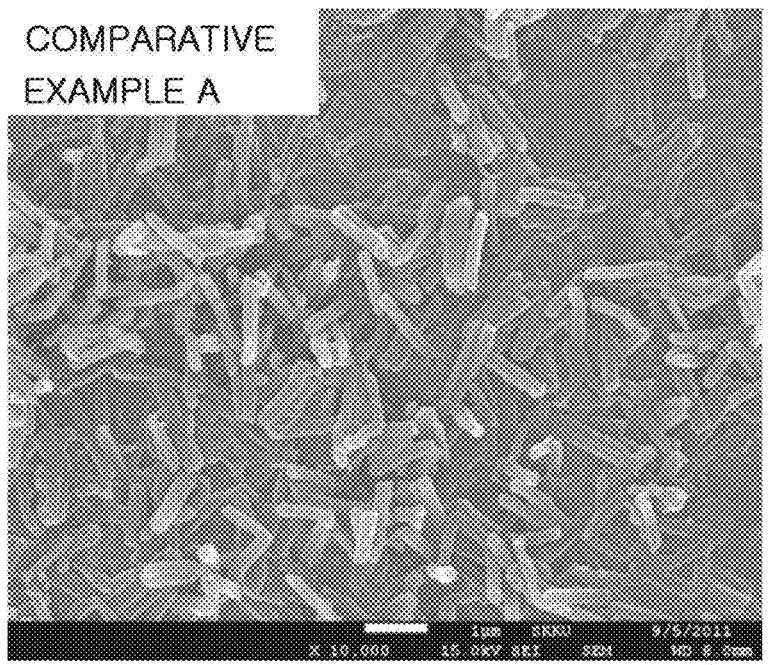
FIGS. 6 to 10 are scanning electron microscopic (SEM) images of the supports of Comparative Example A, Examples 1 to 3, and Comparative Example B, respectively.

Referring to FIG. 6, the support A was found to include only rod-type carbon.

Figure 7:
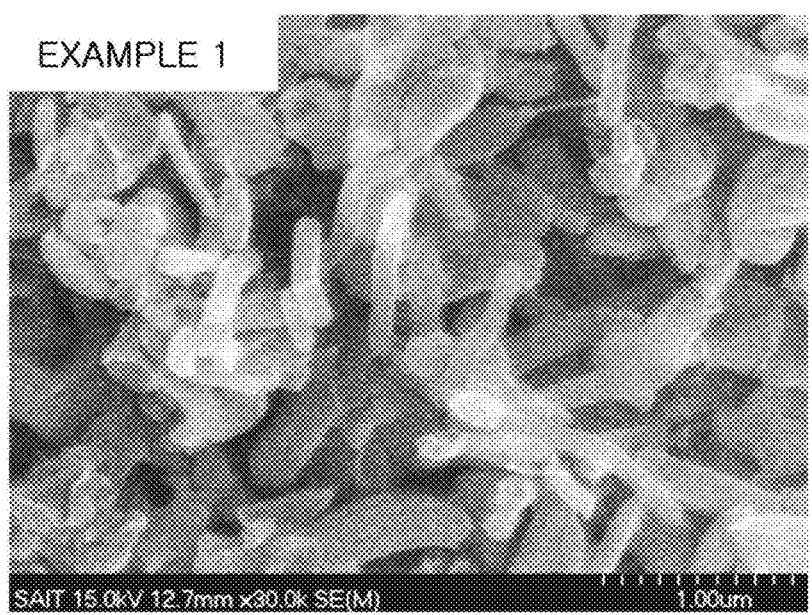
Figure 8:
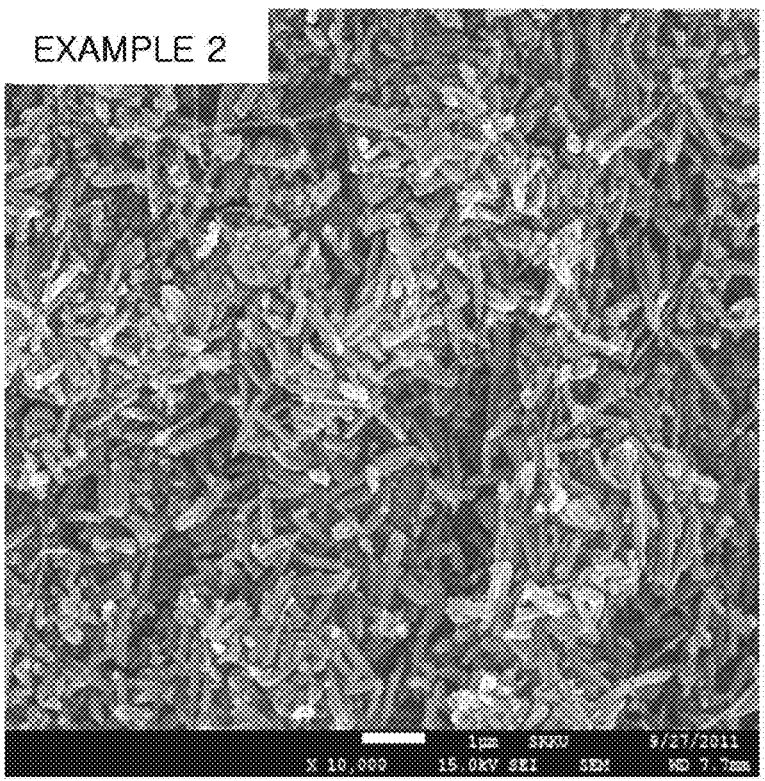
Figure 9:
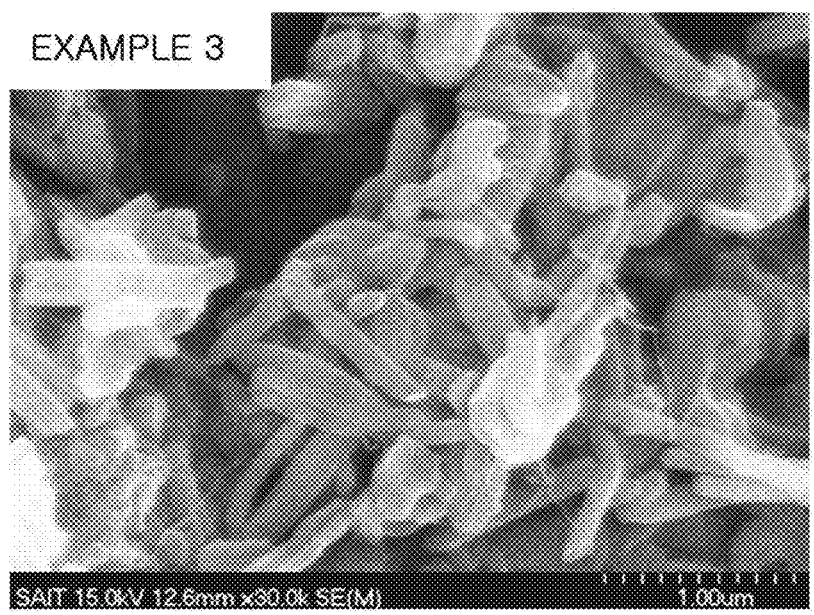

Referring to FIGS. 7 to 9, the composite supports 1, 2, and 3 were found to have similar/same shapes as the support A of FIG. 6. Referring to FIGS. 7 to 9 and FIGS. 4A and 4B, the composite supports 1, 2, and 3 were found to include silicon carbide with the same support and pore shapes as those of the support A.

Figure 10:
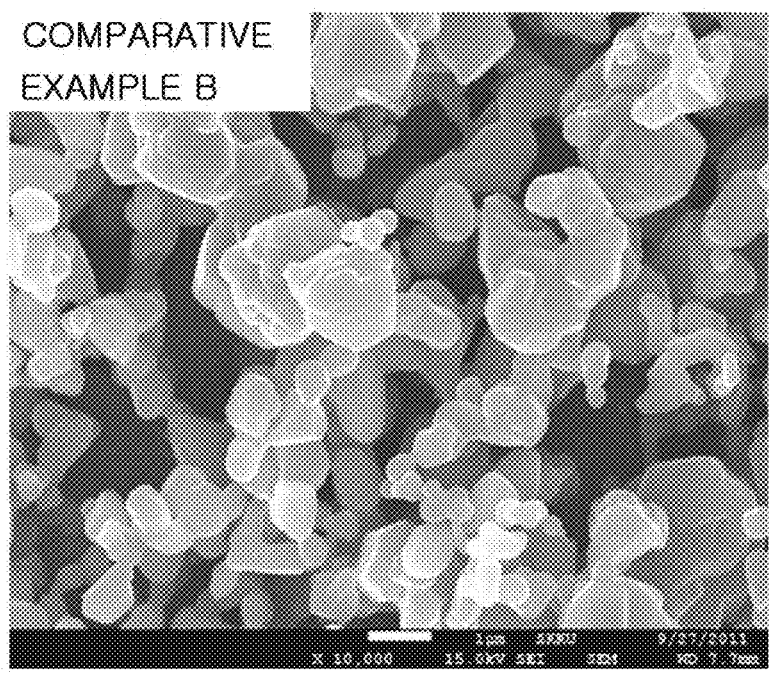
Figure 11:
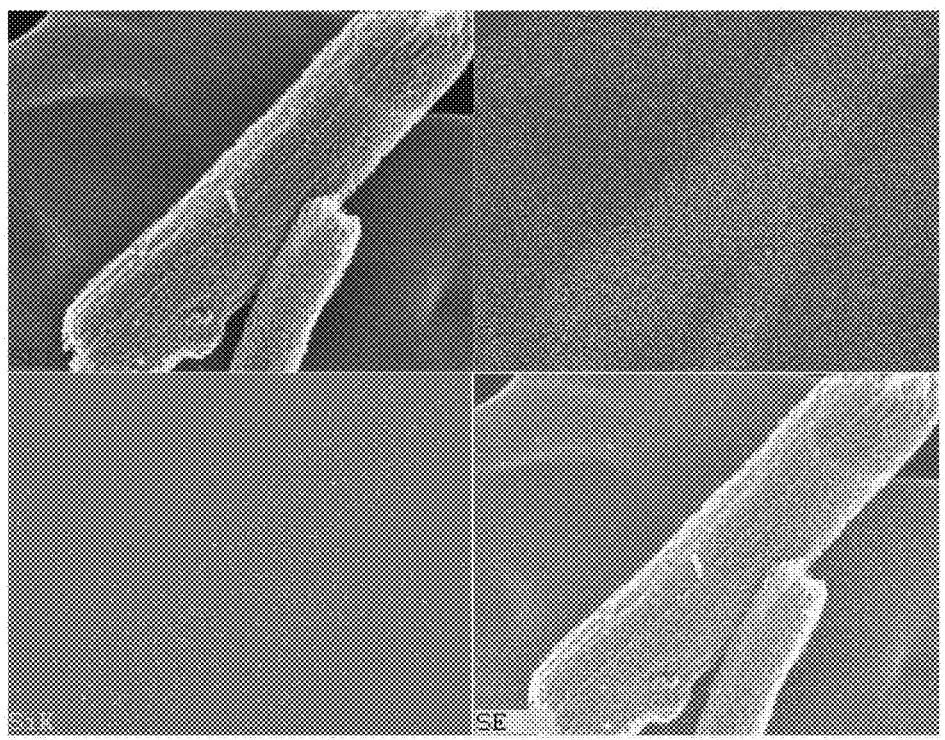
FIG. 11 is illustrates the results of scanning electron microscopic-energy dispersive X-ray ("SEM-EDX") analysis of the support of Example 1.

In addition, referring to FIG. 10, the support B was found not to have a rod shape but rather a spherical shape, unlike the support A.

Referring to FIG. 11, the rod-type composite support 1 was found to have a uniform elemental distribution with each particle including Si and C, which indicates that the composite support 1 has a structure with a uniform distribution of Si—C particles in a rod-type carbon matrix.

EVALUATION EXAMPLE 5

Thermal Gravimetric Analysis (TGA) on Support (SiC Content Calculation)

Carbon is fully decomposed by thermal treatment at a temperature of 500° C. to 600° C. in air, while silicon carbide (SiC) remains stable against thermal treatment at 1000° C. or greater. Thus, a material remaining after thermal treatment on each support at a temperature of about 1000° C. or greater in air may be regarded as essentially silicon carbide (SiC). Based on this fact, after thermal treatment of the support A (Comparative Example A/Thermal treatment temperature: 900° C.), composite support 1 (Example 1/Thermal treatment temperature: 1350° C.), composite support 2 (Example 2/Thermal treatment temperature: 1400° C.), composite support 3 (Example 3/Thermal treatment temperature: 1450° C.), and support B (Comparative Example B/Thermal treatment temperature: 1600° C.) in air while increasing the temperature from room temperature to about 1100° C. at a rate of about 10° C./minute (using a TA Instruments TGA), a weight percentage of the remaining material with respect to the weight of the support before the thermal treatment was calculated as SiC content of each support. The results are shown in Table 3.

TABLE 3

| | Thermal treatment temperature for pre-composite formation (° C.) | SiC content (%) |
|---|---|---|
| Comparative Example A (Support A) | 900 | 0.45 |
| Example 1 (Composite support 1) | 1350 | 10.29 |
| Example 2 (Composite support 2) | 1400 | 51.47 |
| Example 3 (Composite support 3) | 1450 | 51.09 |
| Comparative Example B (Support B) | 1600 | 99.49 |

EVALUATION EXAMPLE 6

Evaluation of Durability as Catalyst Support for Electrode of Fuel Cell

1) Preparation of Electrode Catalyst 0.25 g of the support A (Comparative Example A/Thermal treatment temperature: 900° C.) was dispersed in a mixture of 48 g of water and 60 g of ethylene glycol ("EG") in a 3-necked flask by ultrasonication, and then a dispersion of 4 wt % $H_2PtCl_6 \cdot xH_2O$ (Pt content: 39.8%) in EG was added into the 3-necked flask, and the mixture agitated for about 30 minutes. The resulting mixture was heated from room temperature to about 105° C. over 35 minutes, and the temperature of the mixture was maintained at about 105° C. for about 2 hours. A resulting product was centrifuged and washed about three to four times, followed by freeze-drying to obtain a catalyst A (50 wt % Pt/support A, i.e., a catalyst with 50 wt % Pt loaded on the support A).

Electrode catalysts 1, 2, 3, and B including the composite supports 1, 2, 3, and the support B, respectively, were prepared in the same manner as above, except that the composite supports 1, 2, and 3 and the support B, instead of the support A, were used, respectively.

2) Calculation of Electrochemical Specific Surface Area ("ECSA") Loss after $1000^{th}$ Cycle 0.02 g of each of the catalysts was dispersed in 10 g of distilled water, and 15 μL of each dispersion was dropped onto a rotating glassy carbon electrode ("GCE") using a micropipette, and then dried at room temperature. Afterward, 15 μL of a 0.05 wt % Nafion solution was dropped onto the rotating GCE with the catalyst using a micropipette, and then dried at room temperature, thereby manufacturing an electrode.

The manufactured electrode was loaded as a working electrode onto a rotating disk electrode ("RDE") system, wherein a platinum (Pt) wire as a counter electrode and Ag/AgCl ($KCl_{sat}$) as a reference electrode were prepared. This 3-phase electrode was put in a 0.1 molar (M) $HClO_4$ electrolyte, and oxygen dissolved in the electrolyte was removed by nitrogen bubbling for about 30 minutes. Cyclic voltammetry was performed in a voltage range of about 0.6 volts (V) to about 1.2 V (vs. normal hydrogen electrode ("NHE") using a potentiostat/galvanostat, and then an amount of hydrogen desorption charge ($Q_H$, millicoulombs per square centimeter (mC/cm²)) on the Pt particles in the electrode catalyst A was calculated as a peak area obtained by multiplying a current level by a voltage level in a range of about 0 V to about 0.4 V (vs. NHE) in a cyclic voltammogram of the electrode catalyst A. The amount of hydrogen desorption charge ($Q_H$) of the electrode catalyst A was divided by 0.21 mC/cm² and the weight of Pt particles in the electrode catalyst A to calculate an ECSA (in m²/g) of the Pt particles in the electrode catalyst A. ECSAs of the electrode catalyst A after the $1^{st}$ cycle and after the $1000^{th}$ cycle were calculated, respectively, in the same manner as described above, and then the ECSA (%) after the $1000^{th}$ cycle with respect to the ECSA after the $1^{st}$ cycle (100%) was calculated. The results are shown in FIG. 12.

The ECSA (%) after the $1000^{th}$ cycle of the electrode catalyst 1 (including the composite support 1) and a commercially available Pt/C catalyst (a carbonaceous support-based catalyst loaded with 53.4 wt % of Pt particles per 100 wt % of the entire catalyst; available from TKK Inc.), respectively, were calculated using the electrode catalyst 1 and Pt/C catalyst (TKK Inc.), instead of the electrode catalyst A according to above method. The results are shown in FIG. 12.

Figure 12:
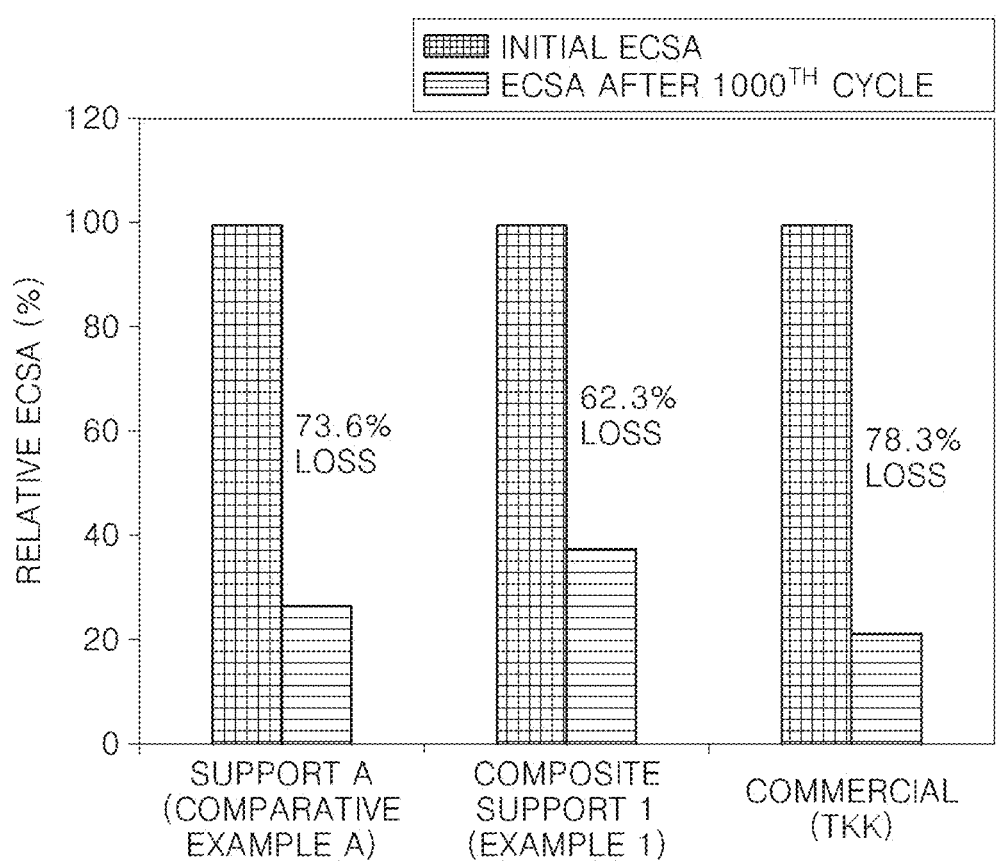
FIG. 12 is a graph of electrochemical specific surface area ("ECSA") initially and after the $1000^{th}$ cycle of electrode catalysts including the supports of Comparative Example A and Example 1, respectively illustrating ECSA loss.

Referring to FIG. 12, the electrode catalyst 1 using the composite support 1 (Example 1) was found to have a smaller ECSA loss of about 62.3% after the $1000^{th}$ cycle, as compared with the electrode catalyst A including the support A (Comparative Example A) with an ECSA loss of about 73.6% after the $1000^{th}$ cycle, and the Pt/C catalyst of TKK Inc. with an ECSA loss of about 78.3% after the $1000^{th}$ cycle, indicating that the electrode catalyst 1 using the composite support 1 (Example 1) has high durability.

3) Evaluation of Oxygen Reduction Reaction (ORR) Activity after $1000^{th}$ Cycle An ORR activity was evaluated with a rotating carbon electrode in an electrolyte containing oxygen dissolved to saturation, wherein ORR currents were recorded in a negative direction from an open circuit voltage ("OCV") to a potential of 0.2 V (vs. NHE) at which a material limiting current occurs. A material activity was evaluated based on the ORR current at a voltage of about 0.9 V. Material activities of the electrode catalyst 1 after the $1^{st}$ cycle and after the $1000^{th}$ cycle were calculated using the above method, and the material activity (%) after the $1000^{th}$ cycle with respect to the material activity (100%) after the $1^{st}$ cycle was calculated. The results are shown in FIG. 13.

A material activity (%) of the Pt/C catalyst (TKK Inc.) after the $1000^{th}$ cycle was calculated using the Pt/C catalyst (TKK Inc.) instead of the electrode catalyst 1 according to above method. The result is shown in FIG. 13.

Figure 13:
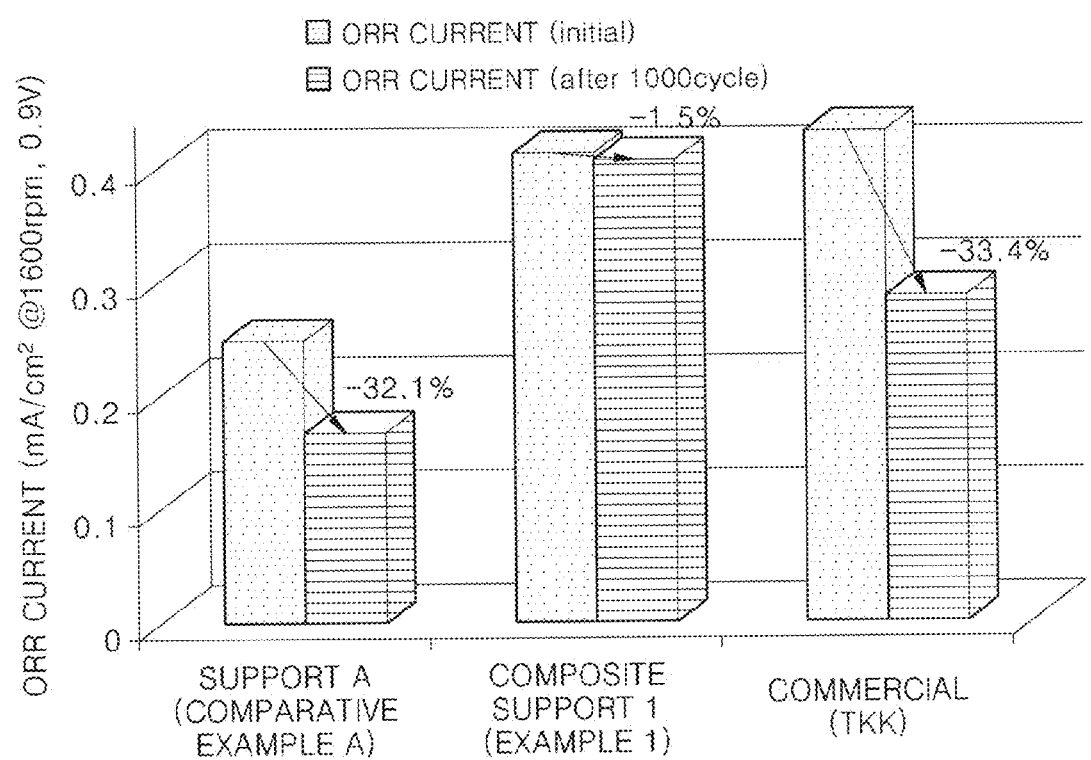
FIG. 13 is a graph of oxygen reduction reaction ("ORR") current (milliamperes per square centimeter, mA/cm$^2$) showing ORR activity after the $1000^{th}$ cycle in the electrode catalysts including the supports of Comparative Example A and Example 1, respectively.

Referring to FIG. 13, the electrode catalyst 1 using the composite support 1 (Example 1) was found to have a smaller material activity loss of about 1.5% after the $1000^{th}$ cycle, as compared with the electrode catalyst A including the support A (Comparative Example A) with a material activity loss of about 32.1% after the $1000^{th}$ cycle, and the Pt/C catalyst of TKK Inc. with a material activity loss of about 33.4% after the $1000^{th}$ cycle, indicating that the electrode catalyst 1 using the composite support 1 (Example 1) has high durability.

As described above, according to the above embodiment of the present disclosure, the above-described composite support has a large specific surface area and high durability, and thus, an improved fuel cell may be implemented using an electrode catalyst with the composite support.

It should be understood that the exemplary embodiment described herein shall be considered in a descriptive sense only and not for purposes of limitation. Descriptions of features, advantages, or aspects within each embodiment shall be considered as available for other similar features, advantages, or aspects in other embodiments.

What is claimed is:

1. A composite support comprising:
   an ordered mesoporous carbon comprising mesopores having an average diameter of about 2 nanometers to about 8 nanometers; and
   a silicon carbide dispersed in the ordered mesoporous carbon,
   wherein the ordered mesoporous carbon is in the form of a framework including walls which define the mesopores, and
   wherein the silicon carbide is in the form of a particle and is disposed on an inner surface of the walls of the framework of the ordered mesoporous carbon.

2. The composite support of claim 1, wherein the silicon carbide is disposed on an inner surface and on an outer surface of the walls of the framework of the ordered mesoporous carbon.

3. The composite support of claim 1, wherein the silicon carbide is bound to the ordered mesoporous carbon.

4. The composite support of claim 1, wherein the silicon carbide has a shape of least one selected from a spherical, platelet, amorphous, and an acicular shape.

5. The composite support of claim 1, wherein the ordered mesoporous carbon and the silicon carbide are in a weight ratio of about 1:99 to about 30:70.

6. The composite support of claim 1, wherein the composite support has a specific surface area of about 300 square meters per gram to about 600 square meters per gram.

7. A method of preparing a composite support, the method comprising:
   contacting an ordered mesoporous silica template and a carbonaceous precursor-containing mixture to prepare a first mixture;
   thermally treating the first mixture at a temperature of about 1300° C. to about 1500° C. to form a pre-composite comprising an ordered mesoporous carbon comprising mesopores having an average diameter of about 2 nanometers to about 8 nanometers, a silicon carbide dispersed in the ordered mesoporous carbon, and the ordered mesoporous silica template; and
   removing the ordered mesoporous silica template from the pre-composite to prepare the composite support, wherein the composite support comprises the ordered mesoporous carbon comprising mesopores having an average diameter of about 2 nanometers to about 8 nanometers and the silicon carbide dispersed in the ordered mesoporous carbon,
   wherein the ordered mesoporous carbon is in the form of a framework including walls which define the mesopores,
   wherein the silicon carbide is in the form of a particle and is disposed on an inner surface of the walls of the framework of the ordered mesoporous carbon, and
   wherein the silicon carbide in the pre-composite is derived from the ordered mesoporous silica template and the carbonaceous precursor of the first mixture.

8. The method of claim 7, wherein the ordered mesoporous silica template comprises at least one selected from MCM-48, SBA-1, SBA-15, KIT-1, and MSU-1.

9. The method of claim 7, wherein a carbonaceous precursor of the carbonaceous precursor-containing mixture comprises at least one selected from glucose, sucrose, fructose, benzene, naphthalene, anthracene, phenanthrene, pyrene, phenol-formaldehyde (PF) resin, urea-formaldehyde (UF) resin, quinoxaline, propylenediamine, 4,4'-dipyridyl, phenanthroline, p-toluenesulfonic acid, and furfuryl mercaptan.

10. The method of claim 7, wherein the carbonaceous precursor-containing mixture further comprises a metal precursor and a solvent.

11. The method of claim 7, wherein the thermally treating of the first mixture is performed at a temperature of about 1350° C. to about 1450° C.

12. The method of claim 7, wherein the thermal treating of the first mixture is performed in an inert atmosphere.

13. The method of claim 7, wherein the removing of the ordered mesoporous silica template from the pre-composite comprises contacting the pre-composite with an acid or an alkali solution capable of dissolving silica.

14. An electrode catalyst for a fuel cell, comprising: the composite support of claim 1; and a catalyst particle disposed on the composite support.

15. A membrane-electrode assembly for a fuel cell, the membrane-electrode assembly comprising:
   a cathode;
   an anode disposed opposite to the cathode; and
   an electrolyte membrane disposed between the cathode and the anode,
   wherein at least one of the cathode and the anode comprises the electrode catalyst of claim 14.

16. A fuel cell comprising the membrane-electrode assembly of claim 15.

* * * * *